United States Patent [19]

McEldowney

[11] Patent Number: 4,601,618

[45] Date of Patent: Jul. 22, 1986

[54] PILOT HOLE LOCATOR AND DRILL GUIDE AND METHOD

[75] Inventor: Paul A. McEldowney, Federal Way, Wash.

[73] Assignee: The Boeing Company, Seattle, Wash.

[21] Appl. No.: 706,005

[22] Filed: Feb. 27, 1985

[51] Int. Cl.⁴ .............................................. B23B 49/02
[52] U.S. Cl. ...................................... 408/1 R; 408/75; 408/82; 408/97
[58] Field of Search .................... 29/26 A; 408/97, 74, 408/75, 82, 115 R, 108, 118, 119, 72 R

[56] References Cited

U.S. PATENT DOCUMENTS

| | | |
|---|---|---|
| 1,598,216 | 8/1926 | Morgan et al. |
| 2,046,637 | 7/1936 | Kuppersmith ........................... 77/62 |
| 2,181,746 | 11/1939 | Siebrandt ............................... 128/83 |
| 2,348,116 | 5/1944 | Dzus ....................................... 77/62 |
| 2,418,956 | 4/1947 | Silver ..................................... 77/62 |
| 2,674,907 | 4/1954 | Zoll ................................. 408/97 X |
| 3,191,462 | 6/1965 | Plunske ................................. 77/55 |
| 3,352,182 | 11/1967 | Norum .................................. 77/62 |
| 3,386,318 | 6/1968 | Pekarcik et al. ....................... 77/62 |
| 3,526,158 | 9/1970 | Adams et al. ......................... 408/97 |
| 3,674,375 | 7/1972 | Reed et al. .......................... 408/103 |
| 4,027,992 | 6/1977 | Mackey et al. ....................... 408/97 |
| 4,484,844 | 11/1984 | Williams ............................... 408/82 |

FOREIGN PATENT DOCUMENTS

| | | | |
|---|---|---|---|
| 850978 | 8/1952 | Fed. Rep. of Germany | 408/97 |
| 2915429 | 10/1980 | Fed. Rep. of Germany | 408/108 |
| 743790 | 6/1980 | U.S.S.R. | 408/100 |

Primary Examiner—William R. Briggs
Attorney, Agent, or Firm—Joan H. Pauly

[57] ABSTRACT

Methods and apparatus for locating and drilling pilot holes. Known systems are time-consuming and difficult to carry out and do not reliably result in straight and accurate pilot holes. The invention provides easy and accurate location and drilling and accurate alignment with an initial hole on an inaccessible surface. Clamp jaws (22, 50) are spring loaded into a closed position. Pliers (82) engage jaw (50) and head (64) of a shaft (60) extending through jaw (50) and attached to jaw (22). Pliers (82) are squeezed to move jaw (50) along shaft (60) away from jaw (22). Clamp (22, 50) is placed around a workpiece (10, 8, 15) with a pilot (38) carried by jaw (22) engaging a back surface pilot hole (16). Pliers (82) are released to allow spring (66) on shaft (60) to clamp jaws (22, 50) around workpiece (10, 8, 15). Drill bit (90) is introduced into a bushing (54) in jaw (50). Drilling is commenced, pilot (38) is retracted into slot (26) in jaw (22), and drilling all the way through workpiece (10, 8, 15) is completed.

14 Claims, 12 Drawing Figures

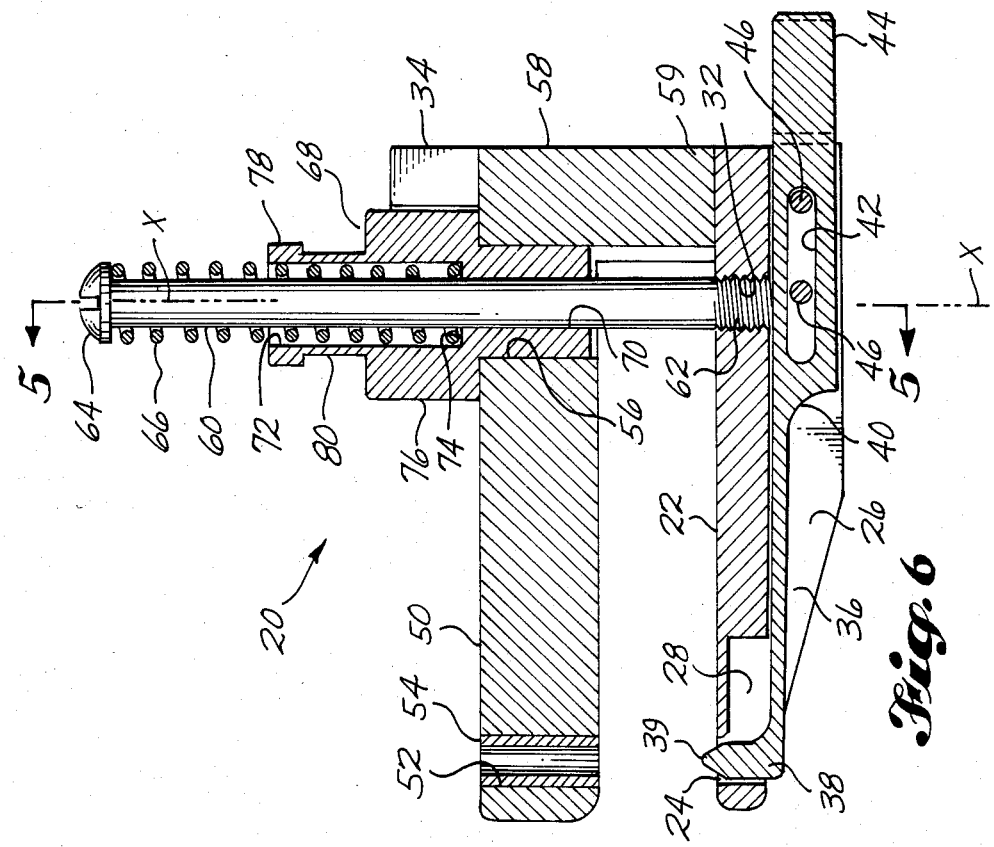
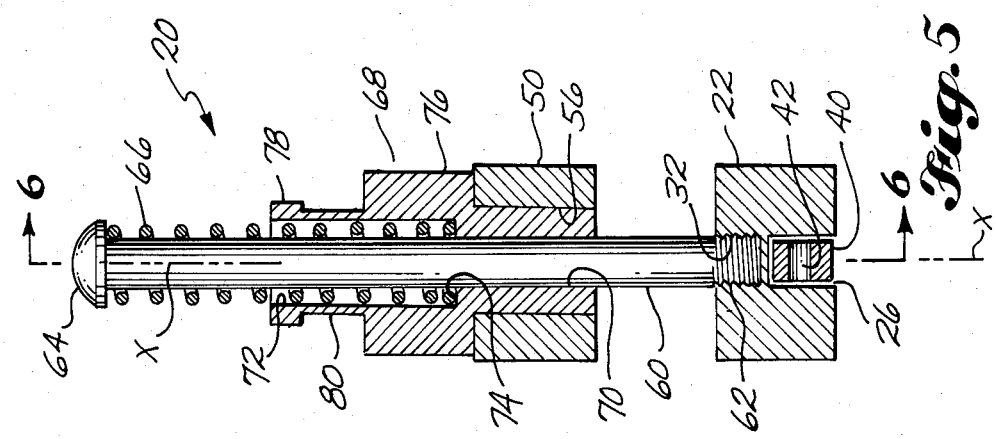

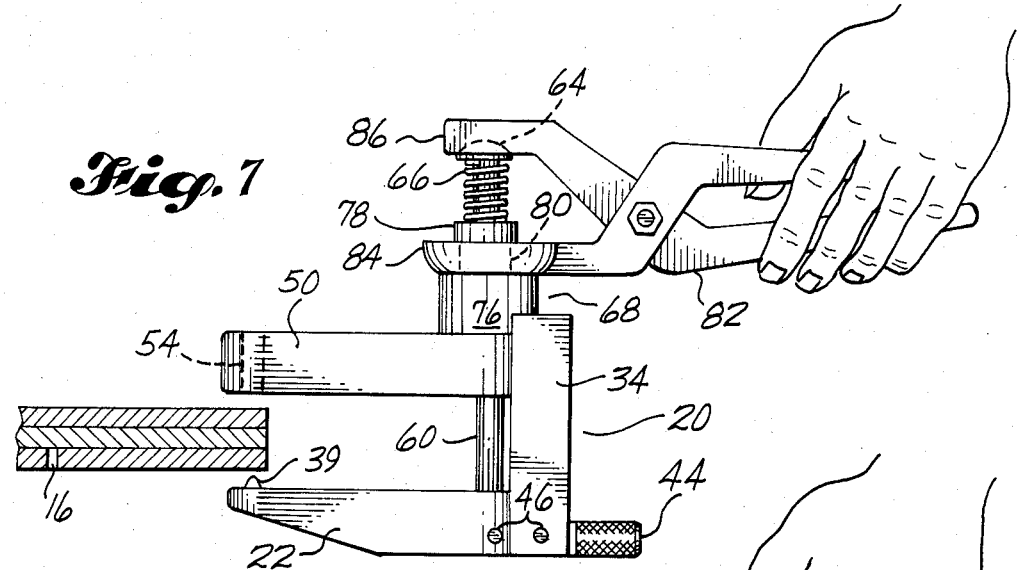
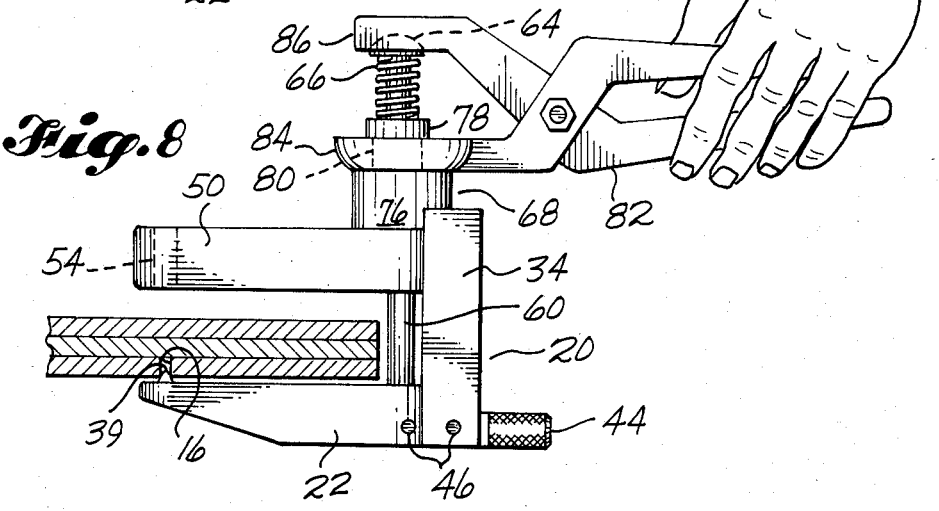
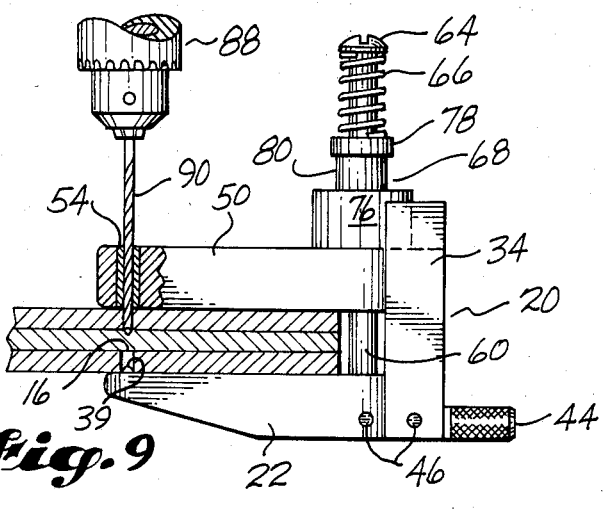

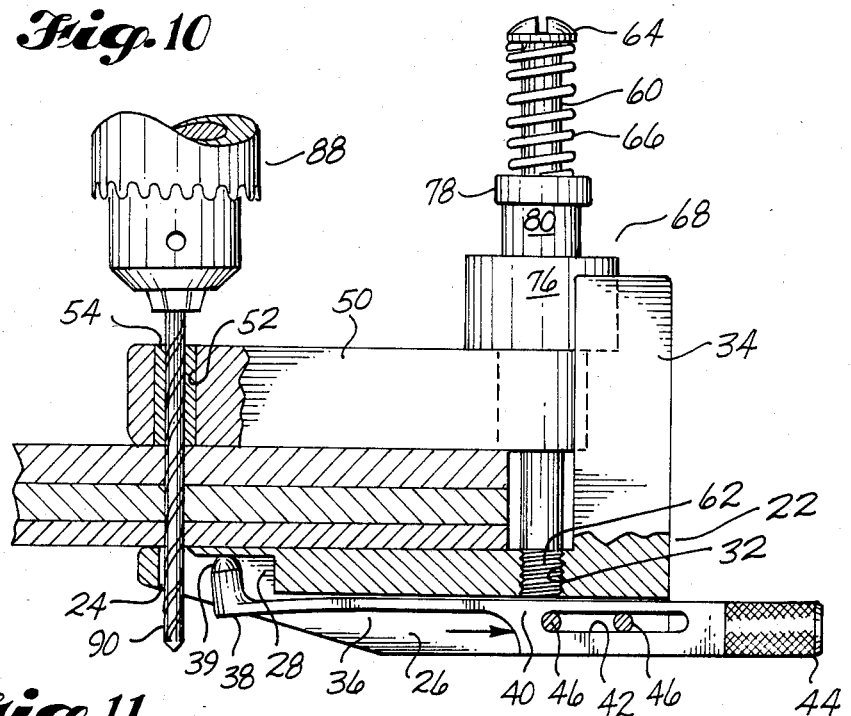
Fig. 10
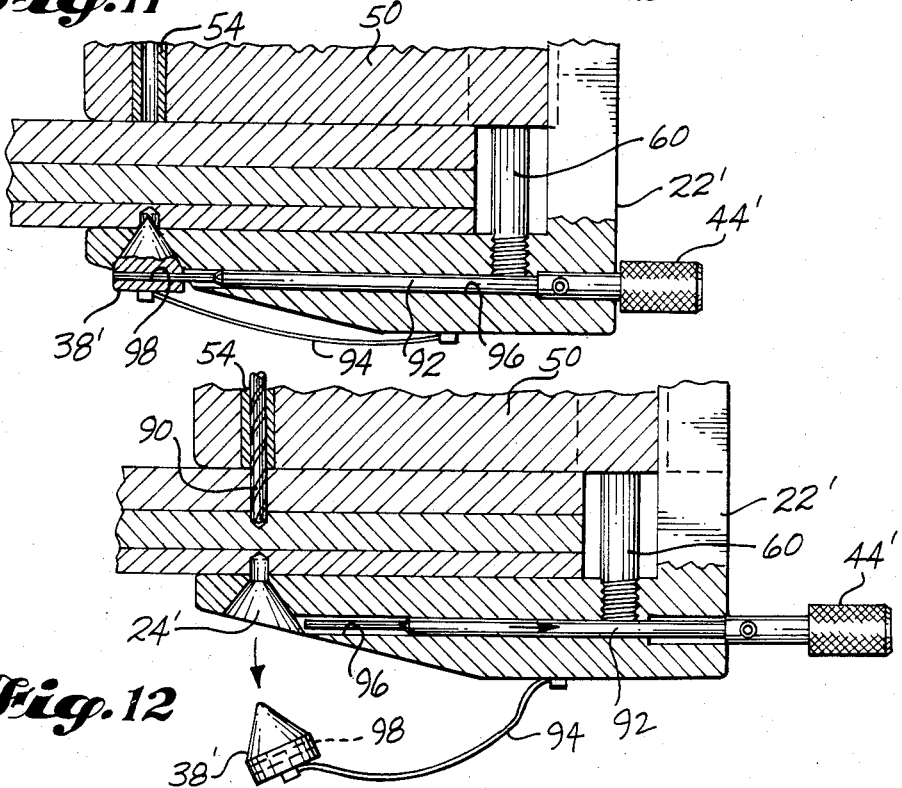
Fig. 11
Fig. 12

PILOT HOLE LOCATOR AND DRILL GUIDE AND METHOD

DESCRIPTION

1. Technical Field

This invention relates to systems for locating pilot holes extending part way into a workpiece and for drilling such holes all the way through the workpiece and, more particularly, to such a system that may be operated with one hand and that employs a spring loaded clamp and a retractable pilot pin.

2. Background Art

The wing structures of certain types of relatively large commercial aircraft have a number of components that are connected together to form the finished wing. Such components include the two opposite skins and stringers, ribs, bulkheads, and seal pans. The bulkheads and seal pans are positioned generally perpendicular to the span of the wing and serve to seal off sections of the wing. The bulkheads extend between opposite sets of stringers, and the seal pans seal the openings formed between the stringers on each outboard side of the bulkheads.

During the construction of a wing, the stringers and seal pans are riveted to the corresponding skin panel, the ribs are riveted to the stringers, and the bulkheads are riveted to the ribs. This assembles all of the parts in their correct relationships to each other, but further fasteners are required to ensure the structural integrity of the wing. For example, a fastener is required at each point where there is a stack-up of a seal pan flange, stringer flange, and rib flange. A pilot hole is provided in the seal pan to ensure that the fastener through the stack-up is correctly positioned. The pilot hole is in the seal pan rather than the rib because placing the pilot hole in the rib flange would not provide sufficiently accurate placement of the fastener.

The placing of the pilot hole on the seal pan provides the desired accuracy in placement but has certain drawbacks. In particular, the seal pan is on the back or outboard side of the stack-up, and thus, the pilot hole is relatively inaccessible. The pilot hole is located in the relatively narrow space between the stack-up and the skin panel and faces the skin panel. Therefore, extending the pilot hole all the way through the three layers of the stack-up by engaging a drill in the pilot hole and drilling toward the rib flange is very difficult, at best. Since the pilot hole must be extended through the stack-up in order to provide a completed pilot hole for reaming the full size hole for the fastener, the only alternative is to commence drilling from the rib side of the stack-up opposite the pilot hole in the seal pan. This creates difficulties in properly locating the pilot hole. In addition, in the sections of the wing close to the wing tip, the distance between the skin panels narrows down considerably, typically to less than twelve inches. Access to the stack-up for drilling the pilot hole all the way through is provided by relatively small access openings in the skin panels. Thus, the access is even more difficult and limited, and it is sometimes necessary to carry out the drilling operation using only one hand.

Methods and apparatus currently in use for drilling the pilot holes have a number of serious drawbacks. A major problem is completed pilot holes that are crooked or mislocated (resulting in a double hole in the seal pan). This problem is especially common when the stack-up is relatively thick, like the three layered stack-up formed where a seal pan, stringer, and rib meet. A crooked or double hole may be the result of inaccurate positioning of the drill perpendicular to the stack-up or inaccurate alignment between the drill and the initial pilot hole in the seal pan. Existing systems are also relatively time-consuming and awkward and difficult to carry out. Such systems generally require either a good deal of set-up time or two hands to complete the operation. In addition, they do not provide any quick and easy method for removing the pilot from the original pilot hole in the seal pan in order to permit drilling all the way through the stack-up.

The patent literature includes a number of examples of devices for correctly locating or positioning a hole and drilling the hole. Such devices are disclosed in U.S. Pat. No.: 1,598,216, granted to L. J. Morgan et al on Aug. 31, 1926; U.S. Pat. No. 2,046,637, granted to F. W. Kuppersmith on July 7, 1936; U.S. Pat. No. 2,181,746, granted to J. R. Siebrandt on Nov. 28, 1939; U.S Pat. No. 2,348,116, granted to W. Dzus on May 2, 1944; U.S. Pat. No. 2,418,956, granted to J. R. Silver on Apr. 15, 1947; U.S. Pat. No. 3,191,462, granted to N. K. Plunske on June 29, 1965; U.S. Pat. No. 3,352,182, granted to V. G. Norum on Nov. 14, 1967; U.S. Pat. No. 3,386,318, granted to L. S. Pekarcik et al on June 4, 1968; and U.S. Pat. No. 3,674,375, granted to E. E. Reed et al on July 4, 1972.

Plunske discloses a centering tool in which a conical guide carried by one end of a housing is positioned in a relatively large aperture in a template. The housing and conical guide have an axial opening therethrough for guiding a drill bit to drill a hole in the workpiece at the center of the aperture in the template. Kuppersmith discloses a clamping jig in which a crank handle is turned to move two plates together to clamp a workpiece therebetween. One of the plates is provided with bushings to guide drill bits, and the clamping apparatus is provided with a spring loaded lock. The rest of the patents disclose devices in which a workpiece is engaged between the jaws of a screw operated clamp and one of the clamp jaws has an opening therethrough for guiding a drill bit.

Morgan et al, Dzus, Norum, and Reed et al each disclose a device in which an existing hole is used as a guide for positioning the clamp. Morgan et al disclose a clamp that is screwed onto a car door to guide the drilling of holes through the outer portion of the door to line up with interior latch and lock mechanisms. Two locating members carried by one of the jaws are positioned inside two existing apertures in the interior mechanism, and holes are drilled through bushings in the other jaw. Apparently, the locating members remain in the apertures throughout the drilling process, and the holes are drilled up to the apertures.

Dzus discloses a device in which a jaw-like member is positioned between two spaced apart plates of the workpiece. An outwardly projecting stud carried by the jaw-like member extends through an existing aperture in one of the plates of the workpiece. A threaded tubular guide is screwed down onto the unapertured plate and serves as a guide for drilling a hole through such plate in alignment with the hole in the other plate.

Norum and Reed et al each disclose a device for reaming worn valve-stem guide bores in internal combustion engines. The device disclosed in each of these two patents includes a guide member that is carried by one jaw or "strap" of a clamp. The guide member has a tapered surface that engages the valve seat, and a center aperture for a drill bit. In each device, the other jaw or strap of the clamp also carries a member for positioning the clamp. The Norum device has a tubular collar that engages a collar carried by the cylinder head. The opposite jaw of the device disclosed by Reed et al carries a collar through which an alignment pin is inserted to engage the valve-stem guide bore. The pin slides in and out of the collar along the axis of the guide bore and the drill bit, and must be moved outwardly along such axis before the reaming or drilling is carried out.

The existing devices discussed above and the above-described patents, together with the prior art cited therein, should be carefully considered for the purpose of putting the present invention into proper perspective relative to the prior art.

DISCLOSURE OF THE INVENTION

A subject of the invention is a device for locating a pilot hole that extends only part of the way through a workpiece, and for guiding a drill to extend such hole all the way through the workpiece. According to an aspect of the invention, the device comprises a clamp which includes opposing jaws movable toward and away from each other along an axis. Each of the jaws has an opening extending therethrough generally parallel to the axis. These openings are aligned with each other. The device also includes a pilot that has a use position in which it projects from one of the openings toward the opposing jaw. Resilient means urges the jaws toward each other to clamp the workpiece therebetween. Moving means is provided for moving the jaws away from each other against the force of the resilient means to permit the jaws to be positioned with the workpiece therebetween and the pilot projecting into the pilot hole. The device has a drill bushing in the other of the openings for guiding a drill bit. Removal means is provided for moving the pilot out of its use position to permit the pilot hole to be drilled all the way through the workpiece.

According to a preferred aspect of the invention, the moving means comprises a passageway extending through one of the jaws along the axis; a shaft extending along the axis and through the passageway, and having a first end portion attached to the other of the jaws and a second opposite end portion projecting outwardly from the passageway; and means for engaging the jaw through which the passageway extends and moving it along the shaft away from the other jaw and into an open position and holding it in said open position. Preferably, the passageway includes an enlarged diameter portion defining a radial shoulder, the second end portion of the shaft includes a head having a radial abutting surface, and the resilient means includes a coil spring surrounding the shaft and having opposite ends urged against such shoulder and such abutting surface, respectively. Also preferably, the means for engaging the jaw includes a tubular projection carried by such jaw and surrounding a mid portion of the shaft. This projection terminates in a radial flange and has a neck portion adjacent to the flange and dimensioned to be received into a slot formed on a first jaw of a pair of pliers. The head of the shaft is dimensioned and positioned to be engaged by a second jaw of the pliers.

According to another preferred aspect of the invention, the pilot has a base portion that is positioned in the opening from which the pilot projects when the pilot is in its use position, and the removal means includes a slot and retraction means. The slot communicates with said opening and extends along the corresponding jaw generally perpendicular to said axis. The retraction means is attached to the base portion of the pilot for retracting the pilot out of such opening and into the slot.

In the preferred embodiment, the retracting means includes an elongated bendable member slidably mounted in the slot, attached to the base portion of the pilot, and sufficiently resilient to urge the pilot against an inner wall surface of the slot to prevent the pilot from returning to its use position while the pilot hole is being drilled. Handle means is carried by the bendable member for easy operation. The preferred embodiment of the pilot removal means has a number of advantages. These advantages include easy and reliable operation and ready accessibility to the operator. In addition, the preferred embodiment also provides security against inadvertent misplacement or loss of the pilot and a means for quickly and easily repositioning the pilot in its use position when one drilling operation has been completed and another is to be commenced.

The removal means for moving the pilot out of its use position may also be provided in other forms. The pilot in one such other form also includes a base portion which is positioned in the opening from which the pilot projects when the pilot is in its use position. There is a radial hole in the base portion of the pilot, and the removal means includes a retainer pin that engages this radial hole. The retainer pin slides generally perpendicular to the axis, into and out from the radial hole. Although this arrangement is not the first preferred embodiment, it does have the advantages of being relatively easy and inexpensive to manufacture.

Another subject of the invention is a method of locating a pilot hole that extends only part of the way through a workpiece, and of guiding a drill to extend this hole all the way through the workpiece. According to an aspect of the invention, the method comprises providing opposing jaws movable toward and away from each other along an axis, and providing an opening through each such jaw generally parallel to the axis. The openings are aligned with each other. Resilient means is provided for urging the jaws toward each other. The method also includes positioning a pilot in a use position in which it projects from one of the openings toward the opposing jaw. An opening force is applied to move the jaws away from each other against the force of the resilient means. With the jaws moved away from each other, the jaws are positioned with the workpiece therebetween and the pilot projecting, into the pilot hole. With the jaws so positioned, the opening force is removed to allow the force of the resilient means to move the jaws toward each other and clamp the workpiece therebetween. Then, the pilot is moved out of its use position and away from the opening from which it projected in its use position, a drill bit is introduced into the other opening to guide the bit, and drilling is carried out to drill all the way through the workpiece from the opening into which the drill bit was introduced to the pilot hole to extend the pilot hole all the way through the workpiece.

A preferred feature of the invention is a drilling step in which the drilling includes two substeps. Before the pilot is moved out of its use position, the workpiece is drilled part of the way through a distance sufficient to insure proper alignment of the finished extended pilot hole. After the pilot has been so moved, the workpiece is drilled the rest of the way through.

According to a preferred aspect of the method of the invention, a shaft is provided which extends along the axis and has a first end portion attached to one of the jaws, a mid portion extending through a passageway in the other jaw, and a second opposite end portion projecting outwardly from the passageway. The step of applying an opening force comprises engaging the jaw through which the passageway extends with a first jaw of a pair of pliers, engaging the second end portion of the shaft with the opposing jaw of the pliers, and operating the pliers to move the jaws of the pliers toward each other to in turn move the clamp jaw through which the passageway extends along the shaft away from the opposing jaw of the clamp. This preferred way of applying the opening force has the advantages of being susceptible to quick and easy operation and of being readily carried out with only one hand. It also has the advantage of not requiring relatively complex and/or expensive apparatus.

In the preferred embodiment of the method of the invention, the step of moving the pilot out of its use position comprises pulling the pilot in a direction generally perpendicular to the axis, out of the opening from which it projects when it is in its use position, and into a slot formed on the corresponding jaw and communicating with such opening. The preferred embodiment further comprises holding the pilot in the slot at least until the step of drilling all the way through the workpiece is completed. This has the advantage of keeping the pilot readily accessible and in a position in which it may quickly and easily be returned to its use position.

The method and apparatus of the invention provide a means for quickly, easily, and reliably locating a pilot hole on a relatively inaccessible surface of a workpiece and drilling the pilot hole all the way through the workpiece. The system of the invention solves the problem of crooked and double holes and consistently results in high quality, straight pilot holes through the workpiece regardless of the thickness of the workpiece. Such features as the spring loading of the clamp make the method and apparatus of the invention readily adaptable to one handed operation without any loss of speed or accuracy. The apparatus of the invention also has the advantages of being relatively simple in construction and relatively inexpensive to manufacture and maintain.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 5 is a vertical sectional view of the apparatus shown in FIGS. 2–4, taken along the line 5—5 in FIG. 6.

FIG. 6 is a vertical sectional view taken along line 6—6 in FIG. 5.

FIG. 7 is a side elevational view of the apparatus of FIGS. 2–6 showing the jaws of the clamp being held apart by a pair of pliers and the clamp being moved into position around a workpiece.

FIG. 8 is like FIG. 7 except that it shows the clamp in position with the pilot in the pilot hole.

FIG. 9 is like FIG. 8 except that it shows the jaws clamped around the workpiece and a drill bit penetrating the workpiece.

FIG. 10 is like FIG. 9, with parts shown in section, except that it shows the pilot in its retracted position and the drill bit all the way through the workpiece.

FIG. 11 is a fragmentary vertical sectional view, with parts shown in elevation, of an alternative embodiment of the apparatus of the invention having alternative pilot retention and removal means.

FIG. 12 is like FIG. 11, except that the pilot is shown released from its use position.

BEST MODE FOR CARRYING OUT THE INVENTION

Figure 1:
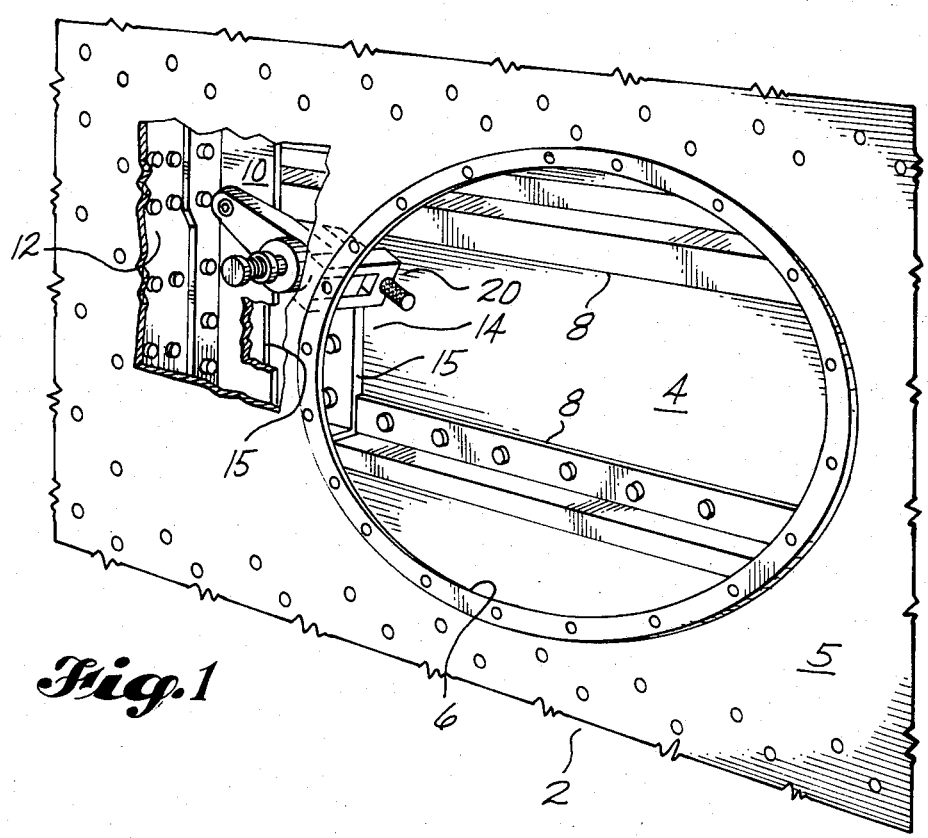
FIG. 1 is a pictorial view of the portion of an aircraft wing, showing the preferred embodiment of the apparatus of the invention clamped in position around flanges of a rib, stringer, and seal pan.
Figure 2:
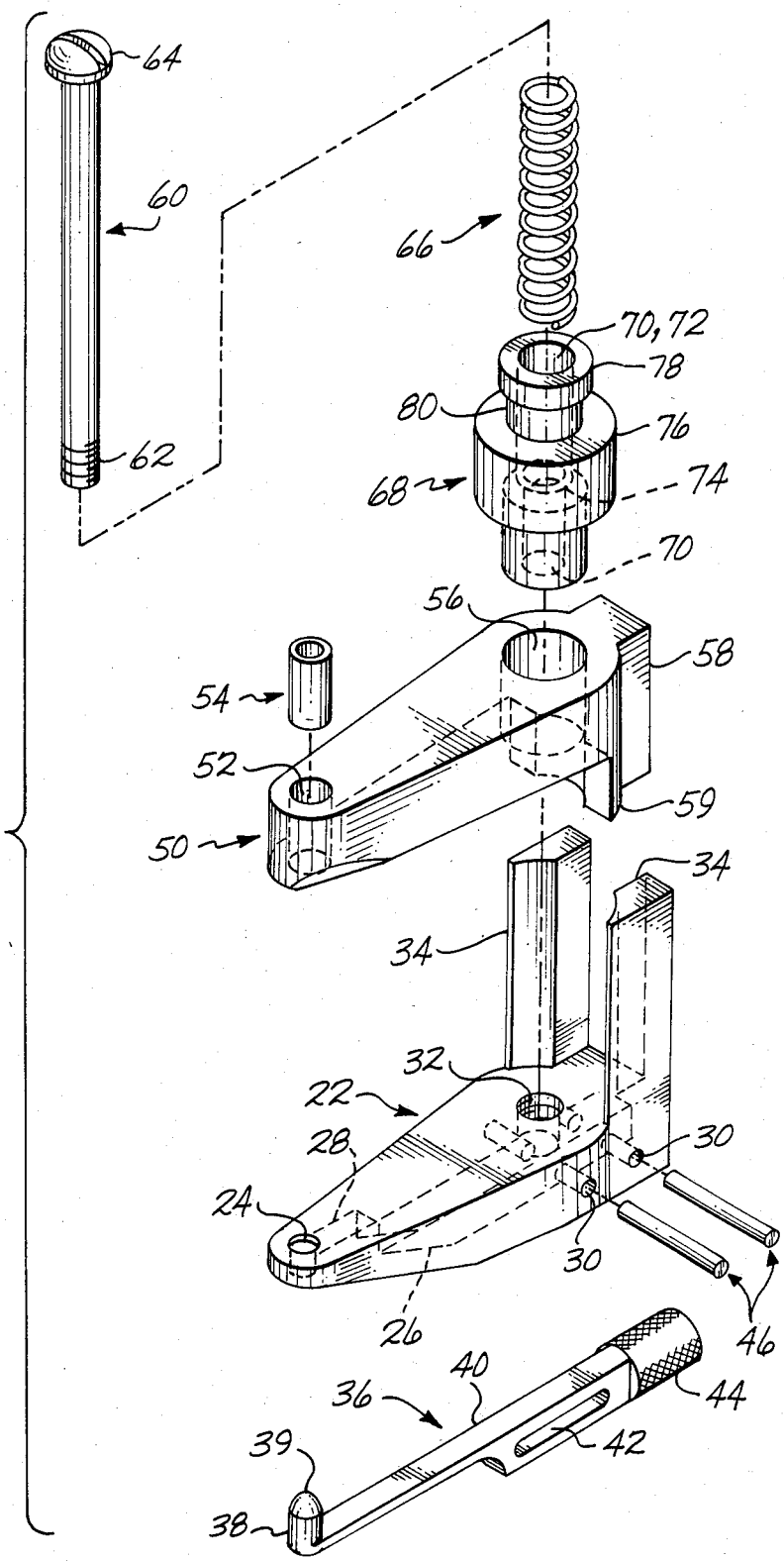
FIG. 2 is an exploded pictorial view of the preferred embodiment of the apparatus of the invention.
Figure 3:
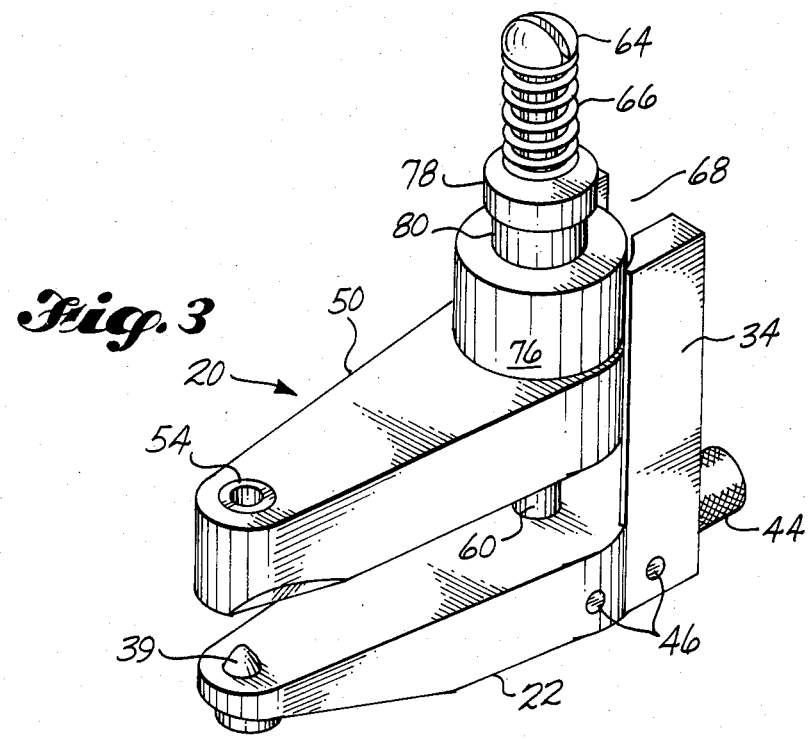
FIG. 3 is a pictorial view of the apparatus shown in FIG. 2 in an assembled condition.
Figure 4:
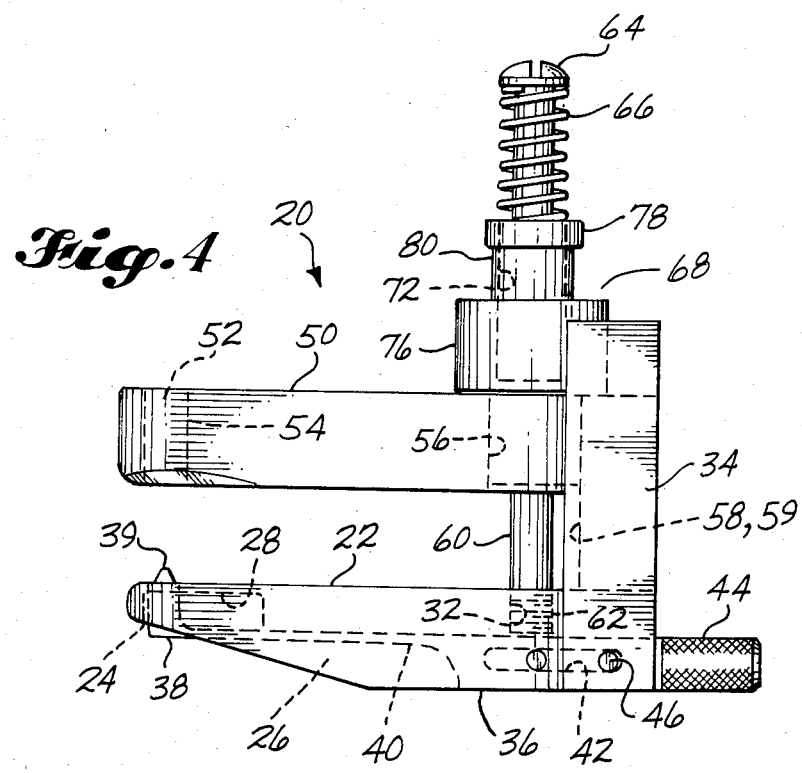
FIG. 4 is a side elevational view of the apparatus shown in FIGS. 2 and 3.

The drawings show a tool 20 that is constructed according to the invention and that also constitutes the best mode of the apparatus of the invention currently known to the applicant. The drawings also illustrate the best mode for carrying out the method of the invention currently known to the applicant. FIG. 1 illustrates the method and apparatus of the invention being used in the construction of a wing of a relatively large commercial aircraft. Although it is anticipated that the primary use for the method and apparatus of the invention will be in environments such as that shown in FIG. 1, it is of course to be understood that the method and apparatus of the invention may also be used to advantage in other situations in which a pilot hole must be extended all the way through a workpiece.

FIG. 1 is a pictorial view of a portion of an aircraft wing 2 oriented with its upper and lower surfaces generally vertical. The wing 2 has an upper skin 4, a lower skin 5, and an access opening 6 in skin 5. A plurality of spaced apart stringers 8 extend along and are riveted to each skin 4, 5. Ribs 10 are riveted to the stringers 8. A bulkhead 12 extends between the upper stringers 8 and the lower stringers (not shown) and is riveted to an upper rib 10 and a lower rib (not shown). Seal pans 14 are riveted to the skins 4, 5 between the stringers 8. The pans 14 fill the spaces between the bulkhead 12 and the skins 4, 5 and, together with the bulkhead 12, completely seal off a section of the wing 2. Each pan 14 is shaped generally like a dish pan with a bottom wall and four sidewalls forming flanges 15. One flange 15 is riveted to the corresponding skin 4, 5, and another opposite flange is part of a stack-up consisting of a rib flange, a stringer flange, and the flange 15. The elements of this stack-up must be fastened together after the parts of the wing 2 have been assembled and riveted together as described above. As discussed above, the pilot hole 16 for the fastener hole in the stack-up is in the seal pan flange 15 and, thus, the only access thereto is in the relatively narrow and inaccessible space between the flange 15 and the skin 4, 5.

The locator and drill guide tool 20 of the invention includes a clamp having two opposing jaws 22, 50 movable toward and away from each other along an axis x. Each jaw 22, 50 has a clamping surface. The clamping surfaces are usually essentially flat and essentially parallel to each other to clamp a flat workpiece of uniform thickness. However, to accommodate a contoured workpiece or a workpiece with tapering thickness, the clamping surfaces may be contoured or nonparallel to each other. The clamping surfaces move together to firmly clamp a workpiece therebetween. The clamp is spring loaded to continuously urge the jaws and their clamping surfaces together into a clamping position. The jaws 22, 50 have aligned openings 24, 52, respectively. These openings 24, 52 are generally parallel to the axis x and provide a means for drilling a pilot hole all the way through the workpiece. In most situations, the pilot hole is normal to the workpiece and the openings 24, 52 are parallel to axis x. However, it may be desirable to have a pilot hole at an angle other than 90° to the workpiece, and in such case, the openings 24, 52 would form an acute angle with axis x.

Referring to the drawings, the preferred embodiment of the clamp jaw 22 is a generally flat member having two laterally spaced apart elongated guide legs 34 projecting perpendicularly outwardly therefrom at its back end. The guide legs 34 project from the clamping surface parallel to the axis x and serve to guide movement of the jaw 50 toward and away from the jaw 22. The legs 34 also prevent relative rotational movement of the jaws 22, 50 with respect to each other. Two openings 24, 32 extend through the flat portion of the jaw 22 from the clamping surface to the opposite outer surface. The first of these openings 24 is the aligned opening mentioned above and is positioned near the front end of jaw 22. The other opening is a threaded hole 32 for mounting a guide shaft 60, to be described in more detail below. A slot 26 is formed on the outer surface of the jaw 22 opposite the clamping surface and extends, perpendicularly to opening 24, along most of the length of the jaw 22 from the opening 24 to the back end of the jaw 22. The slot 26 has a relatively deep portion 28 that communicates with the opening 24. The jaw 22 is also provided with two holes 30 extending laterally therethrough perpendicular to the slot 26 near the back of the jaw 22. These holes 30 intersect the slot 26.

A pilot mechanism 36 is mounted on the jaw 22 by means of retainer pins 46. The mechanism 36 includes a pilot pin portion 38 having a generally conical tip 39. The pin portion 38 has a use position in which its base is positioned in the opening 24 with the conical tip 39 projecting outwardly from the clamping surface toward the opposite jaw 50. It also has a retracted position in which it is positioned in the relatively deep portion 28 of the slot 26. The base of pin portion 38 is attached to and is preferably an integral part of an elongated bendable member 40. The member 40 is perpendicular to the pin portion 38 and extends along the slot 26 and out through the back end of the jaw 22. The member 40 terminates in a handle 44.

The rear portion of the bendable member 40 is thicker than the forward portion and has a slot 42 extending laterally therethrough. This slot 42 permits the pilot mechanism 36 to be slidably attached to the jaw 22. The slot 42 is aligned with the holes 30 in the jaw 22 for the retainer pins 46. When the pins 46 are placed in the holes 30, a mid portion of each pin 46 engages the slot 42. The slot 42 is dimensioned and positioned to allow sliding movement of the elongated bendable member 40 in the slot 26 to move the pilot pin 38 from its use position shown in FIGS. 3, 4, and 6-9 to its retracted position shown in FIG. 10. To move the pilot pin 38 from one position to another the operator simply grasps the handle 44 and pushes or pulls in a direction parallel to the axis of the bendable member 40. Thus the pilot pin 38 may be quickly and easily moved to the desired position and is not subject to loss or displacement because it is always securely attached to the jaw 22.

Preferably, the member 40 is made from spring steel that is sufficiently resilient to retain pilot pin 38 in both its use position and its retracted position. Forming member 40 from such a material has the additional advantage of providing automatic adjustment to variations in pilot hole size caused by paint or other substances in the pilot hole 16 or by variations in the initial forming of pilot hole 16. This automatic adjustment insures that firm clamping contact with the workpiece is always made by both jaws 22, 50.

The other jaw 50 is a generally flat member that has two openings 52, 56 extending therethrough. The opening 52 at the forward end of the jaw 50 is aligned with the opening 54 at the forward end of the jaw 22, and the opening 56 near the rear end of the jaw 50 is aligned with the threaded hole 32 in the jaw 22. A drill bushing 54 is received into the opening 52 for guiding a drill bit 90 to drill a pilot hole all the way through a workpiece 10, 8, 14 clamped between the two jaws 22, 50. The other cylindrical opening 56 receives a bushing 68 through which the shaft 60 slides.

The shaft 60 mounts the jaw 50 for sliding movement toward and away from the jaw 22. The shaft 60 has a threaded end 62 that threadedly engages the threaded hole 32 in the lower jaw 22. The shank of the shaft 60 extends through the slide passageway 70 in the bushing 68 to permit the jaw 50 to slide axially along the shaft 60. The axis of the shaft 60 defines the axis x along which the jaws 22, 50 move with respect to each other.

A rectangular guide portion 58 is formed at the rear end of the jaw 50. This guide portion 58 is dimensioned to fit relatively closely between the two projecting guide legs 34 on the lower jaw 22. The fit between guide portion 58 and guide legs 34 is close enough to prevent rotation of the two jaws 22, 50 with respect to each other but not close enough to interfere with smooth sliding motion of the jaw 50 toward and away from jaw 22.

In the assembled tool 20, the shaft 60 extends through the bushing 68 carried by the jaw 50, with its lower end 62 attached to the jaw 22 by means of the threaded engagement of end 62 in hole 32 and with its opposite end projecting axially outwardly from the bushing 68. A coil spring 66 surrounds this opposite end and urges the jaws 22, 50 toward each other. The jaw 50 has a foot portion 59 that is urged against the facing surface of the lower jaw 22 by the spring 66. This foot portion 59 serves to limit movement of the jaw 50 toward the jaw 22. The dimensioning of the foot portion 59, and thus of the minimum space between the jaws 22, 50, is determined by the needs of a particular situation. It is desirable for this dimensioning to be such that the operator of the tool 20 need only move the jaw 50 a minimal amount in order to fully open the clamp and position it around a workpiece. The amount of movement must of course be sufficient to permit the jaws 22, 50 to be positioned around the workpiece and to insure that the workpiece is firmly clamped between the jaws 22, 50. An example of suitable dimensioning is a travel of jaw 50 from a position in which it is 0.5 inches from jaw 22 to a position in which it is 1.2 inches from jaw 22. This dimensioning is suitable for engaging a workpiece with a total thickness of about 0.6 to about 1.1 inches.

In the preferred embodiment of the tool 20, the slidable mounting of jaw 50 on the shaft 60 is designed to permit quick and easy moving of the jaw 50 along the shaft 60 away from the jaw 22 using a pair of pliers 82 of the type shown in the drawings. The bushing 68 has four portions of varying diameters. The lower cylindrical portion is dimensioned to fit snugly and securely in the cylindrical hole 56 in the jaw 50. Above this lower portion is a collar portion 76 having a relatively large diameter. The lower radial surface of the collar 76 abuts the outer surface of the jaw 50 in the assembled tool 20. Outwardly of the collar 76 is a neck portion 80 having a diameter dimensioned to be received into the slotted jaw 84 of the pliers 82. The neck 80 is formed between the collar 76 and an outer radial flange 78. The axial distance between the collar 76 and flange 78 is dimensioned to closely receive the slotted jaw 84 as shown in FIGS. 7 and 8. The collar 76, neck 80, and flange 78 form a tubular projection on the flat outer surface of jaw 50. The shaft 60 projects upwardly and axially outwardly from this tubular projection formed by the bushing 68. The head 64 of the shaft 60 opposite the threaded end 62 is dimensioned and positioned to be received into a recess in the jaw 86 of the pliers 82 opposing the slotted jaw 84. The passageway 70 through the bushing 68 has an enlarged diameter portion 72 forming an upwardly and outwardly facing radial shoulder 74. The spring 66 surrounds the shaft 60 with one end of the spring abutting the shoulder 74 and the other end of the spring abutting the lower surface of the head 64 of the shaft 60 which forms a radial abutting surface.

FIGS. 7-10 illustrate the carrying out of the preferred embodiment of the method of the invention. In FIGS. 7-10, the workpiece is a stack-up of a rib flange 10, a stringer flange 8, and a seal pan flange 15. FIG. 1 illustrates a typical location of such a stack-up in a portion of an aircraft wing 2 near the wing tip where access to the stack-up is particularly difficult.

To locate the pilot hole 16, an opening force is applied to move the jaws 22, 50 away from each other against the force of the resilient spring 66. As can be seen in FIGS. 7 and 8, this is done by engaging the neck 80 of the bushing 68 with the slotted jaw 84 of the pliers 82 and engaging the head 64 of the shaft 60 in the recess in the opposite plier jaw 86. The pliers 82 are then operated to squeeze the plier jaws 84, 86 together to in turn move the bushing 68 and jaw 50 to which it is secured axially along the shaft 60 away from the jaw 22. This movement of the bushing 68 toward the head 64 of the shaft 60 compresses the spring 66 between the shoulder 74 and radial abutting surface of the head 64. At this time, the pilot mechanism 36 is positioned with the pilot pin 38 in its use position with its conical tip 39 projecting from the clamping surface toward the jaw 50.

With the tool jaws 22, 50 moved away from each other and with the pilot 36 in its use position, the tool 20 is moved into position with the jaws 22, 50 straddling the stack-up 10, 8, 15 and the pilot pin tip 39 projecting into the pilot hole 16 in the seal pan flange 15. (See FIG. 8.) This can easily be accomplished using only the one hand that is grasping and squeezing the pliers 82. When the jaws have been positioned with the stack-up 10, 8, 15 therebetween and the pilot pin tip 39 in the pilot hole 16, the opening force may be removed. The removal of the opening force allows the energy stored in the compressed spring 66 to be released so that the force of the spring 66 moves the jaws 22, 50 toward each other to clamp the stack-up 10, 8, 15 between the jaws 22, 50. The removal of the opening force is accomplished simply by releasing the squeezing pressure on the pliers 82. Then the pliers 82 may be removed from the tool 20.

With the tool 20 securely clamped onto the stack-up 10, 8, 15, the drilling of the pilot hole to extend it all the way through the stack-up 10, 8, 15 may be commenced. The bit 90 of the drill 88 is introduced into the drill bushing 54 carried by the jaw 50. The alignment of the openings 24, 52 and the guiding of drill bit 90 by bushing 54 insure that the pilot hole will be drilled straight and will be accurately perpendicular to the stack-up 10, 8, 15. Preferably, the drilling operation is carried out in two parts. The first part of the drilling drills through the rib flange 10 a distance sufficient to insure that there will be no undesired movement of the tool 20 away from the pilot hole 16 when the pilot pin 38 is retracted. This in turn insures that the finished extended pilot hole is in proper alignment. The initial portion of the drilling operation is illustrated in FIG. 9. After the initial drilling is carried out, the pilot mechanism 36 is operated to move the pilot pin 38 out of its use position and away from the opening 24. With the pilot pin 38 safely out of the way, the drilling may be completed and the pilot hole extended all the way through the stack-up 10, 8, 15. FIG. 10 shows the end of the drilling operation.

The moving of the pilot pin 38 is accomplished by simply grasping the handle 44 and pulling in a rearward direction. This pulls the elongated member 40 rearwardly and the pilot pin 38 out of the opening 24 and into the forward portion 28 of the slot 26. To facilitate the smooth movement of the pilot pin 38, the tip 39 has a somewhat rounded shape and the edge of the opening 24 against which the tip 39 must slide is beveled. The pilot mechanism 36 is securely maintained in its retracted position shown in FIG. 10 by the force of the spring steel forming the elongated bendable member 40 urging the tip 39 against the downwardly facing inner wall of slot portion 28. The pilot mechanism 36 will remain in its retracted position until a positive force is applied to the handle 44 to slide it in a forward direction and move the pin 38 back into the opening 24. This may be done at any time after completion of the drilling procedure and removal of the drill bit 90 from the tool 20.

FIGS. 11 and 12 illustrate an alternative embodiment of the invention having a modified lower jaw 22', pilot pin 38', and pilot pin retention and removal means. Instead of the slot 26, the modified jaw 22' has a pin passageway 96 through which a retainer pin 92 slides. Passageway 96 communicates with opening 24' and extends perpendicularly and rearwardly therefrom through the back end of jaw 22'. A handle 44' is attached to the back end of pin 92. Pilot pin 38' is generally conical with a tip portion 39' and a base portion. When pin 38' is in its use position, shown in FIG. 11, the tip 39' projects from opening 24' and the base portion is positioned in opening 24'. The base portion of pin 38' has a radial hole 98 extending therethrough. Retainer pin 92 is received into radial hole 98 to hold pilot pin 38' in its use position, as shown in FIG. 11. To remove pin 38' from its use position, handle 44' is grasped and pulled rearwardly. This pulls retainer pin 92 out of hole 98 and allows pilot pin 38' to slip out of opening 24' and away from jaw 22'. Strap 94 attaches pilot pin 38' to the bottom of jaw 22' to prevent loss of pin 38'. FIG. 12 shows retainer pin 92 retracted and pilot pin 38' falling away from jaw 22'.

Throughout the description of the structure and operation of the preferred embodiment of the method and apparatus of the invention, the terms "lower", "upper" and the like have been used. These terms have been used solely for the purpose of facilitating the description of the invention. The terms refer to the orientation of the tool of the invention shown in the drawings and a possible use attitude of the tool of the invention. The terms are not intended to indicate that the use attitude of the tool is in any way limited to the attitude shown in the drawings. It is intended to be understood that the tool of the invention may be used to advantage in a wide variety of attitudes including attitudes, such as that shown in FIG. 1, that would be extremely difficult or awkward using conventional apparatus and methods.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. A device for locating a pilot hole that extends only part of the way through a workpiece, and for guiding a drill to extend said hole all the way through the workpiece, said device comprising:
    a clamp including opposing jaws movable toward and away from each other along an axis, each of said jaws having an opening extending therethrough generally parallel to said axis, and said openings being aligned with each other;
    a pilot having a use position in which it projects from one of said openings toward the opposing jaw;
    resilient means for urging the jaws toward each other to clamp the workpiece therebetween;
    moving means for moving the jaws away from each other against the force of the resilient means to permit the jaws to be positioned with the workpiece therebetween and the pilot projecting into the pilot hole;
    a drill bushing in the other of said openings for guiding a drill bit; and
    removal means for moving the pilot out of its use position to permit the pilot hole to be drilled all the way through the workpiece.

2. A device as described in claim 1, in which the moving means comprises a passageway extending through one of the jaws along said axis; a shaft extending along said axis and through the passageway, and having a first end portion attached to the other of the jaws and a second opposite end portion projecting outwardly from the passageway; and means for engaging said one jaw and moving it along the shaft away from said other jaw and into an open position, and holding it in said open position.

3. A device as described in claim 2, in which the passageway includes an enlarged diameter portion defining a radial shoulder, said second end portion of the shaft includes a head having a radial abutting surface, and the resilient means includes a coil spring surrounding the shaft and having opposite ends urged against said shoulder and said abutting surface, respectively.

4. A device as described in claim 3, in which the means for engaging said one jaw includes a tubular projection carried by said one jaw and surrounding a mid portion of the shaft; said projection terminating in a radial flange, and having a neck portion adjacent to such flange and dimensioned to be received into a slot formed on a first jaw of a pair of pliers; and in which said head of the shaft is dimensioned and positioned to be engaged by a second jaw of such pliers.

5. A device as described in claim 1, in which the pilot has a base portion that is positioned in said one opening when the pilot is in its use position; and the removal means includes a slot communicating with said one opening and extending along the corresponding jaw generally perpendicular to said axis, and retraction means attached to said base portion for retracting the pilot out of said one opening and into said slot.

6. A device as described in claim 5, in which the retraction means includes an elongated bendable member slidably mounted in the slot, attached to said base portion, and sufficiently resilient to urge the pilot against an inner wall surface of the slot to prevent the pilot from returning to its use position while the pilot hole is being drilled; and handle means carried by said bendable member.

7. A device as described in claim 3, in which the pilot has a base portion that is positioned in said one opening when the pilot is in its use position; and the removal means includes a slot communicating with said one opening and extending along the corresponding jaw generally perpendicular to said axis, and retraction means attached to said base portion for retracting the pilot out of said one opening and into said slot.

8. A device as described in claim 7, in which the retraction means includes an elongated bendable member slidably mounted in the slot, attached to said base portion, and sufficiently resilient to urge the pilot against an inner wall surface of the slot to prevent the pilot from returning to its use position while the pilot hole is being drilled; and handle means carried by said bendable member.

9. A device as described in claim 1, in which the pilot includes a base portion that is positioned in said one opening when the pilot is in its use position and that has a radial hole therein, and the removal means includes a retainer pin slidable generally perpendicular to said axis into and out from said radial hole.

10. A method of locating a pilot hole that extends only part of the way through a workpiece, and of guiding a drill to extend said hole all the way through the workpiece, said method comprising:
    providing opposing jaws movable toward and away from each other along an axis, and providing an opening through each such jaw generally parallel to said axis, said openings being aligned with each other;
    providing resilient means for urging the jaws toward each other;
    positioning a pilot in a use position in which it projects from one of said openings toward the opposing jaw;
    applying an opening force to move the jaws away from each other against the force of the resilient means;
    with the jaws moved away from each other, positioning the jaws with the workpiece therebetween and the pilot projecting into the pilot hole;
    with the jaws so positioned, removing the opening force to allow the force of the resilient means to move the jaws toward each other and clamp the workpiece therebetween; and
    with the workpiece clamped between the jaws:
        moving the pilot out of its use position and away from said one opening;

introducing a drill bit into the other of said openings to guide said bit; and drilling all the way through the workpiece from said other opening to the pilot hole to extend said hole all the way through the workpiece.

11. A method as described in claim 10, in which the step of drilling all the way through the workpiece comprises, before moving the pilot out of its use position, drilling part of the way through the workpiece a distance sufficient to ensure proper alignment of the finished extended pilot hole; and, after so moving the pilot, drilling the rest of the way through the workpiece.

12. A method as described in claim 10, which further comprises providing a shaft extending along said axis and having a first end portion attached to one of said jaws, a mid portion extending through a passageway in the other of said jaws, and a second opposite end portion projecting outwardly from the passageway; and in which the step of applying an opening force comprises engaging said other jaw with a first jaw of a pair of pliers, engaging said second end portion of the shaft with the opposing jaw of the pliers, and operating the pliers to move the jaws of the pliers toward each other to in turn move said other jaw of the clamp along the shaft away from said one jaw of the clamp.

13. A method as described in claim 10, in which the step of moving the pilot out of its use position comprises pulling the pilot in a direction generally perpendicular to said axis, out of said one opening, and into a slot formed on the corresponding jaw and communicating with said one opening; and which further comprises holding the pilot in said slot at least until the step of drilling all the way through the workpiece is completed.

14. A method as described in claim 12, in which the step of moving the pilot out of its use position comprises pulling the pilot in a direction generally perpendicular to said axis, out of said one opening, and into a slot formed on the corresponding jaw and communicating with said one opening; and which further comprises holding the pilot in said slot at least until the step of drilling all the way through the workpiece is completed.

* * * * *